United States Patent
Chen et al.

(10) Patent No.: US 11,460,903 B2
(45) Date of Patent: Oct. 4, 2022

(54) POWER CONSUMPTION OPTIMIZATION ON THE CLOUD

(71) Applicant: Red Hat, Inc., Raleigh, NC (US)

(72) Inventors: Huamin Chen, Westborough, MA (US); Jay Vyas, Concord, MA (US)

(73) Assignee: Red Hat, Inc., Raleigh, NC (US)

(*) Notice: Subject to any disclaimer, the term of this patent is extended or adjusted under 35 U.S.C. 154(b) by 350 days.

(21) Appl. No.: 16/700,233

(22) Filed: Dec. 2, 2019

(65) Prior Publication Data
US 2020/0103952 A1 Apr. 2, 2020

Related U.S. Application Data

(63) Continuation of application No. 15/649,104, filed on Jul. 13, 2017, now Pat. No. 10,496,150.

(51) Int. Cl.
*G06F 1/32* (2019.01)
*G06F 1/3209* (2019.01)
(Continued)

(52) U.S. Cl.
CPC ............ *G06F 1/3209* (2013.01); *G06F 1/324* (2013.01); *G06F 1/3287* (2013.01);
(Continued)

(58) Field of Classification Search
CPC ....................................................... G06F 1/32
See application file for complete search history.

(56) References Cited

U.S. PATENT DOCUMENTS 8,756,609 B2 6/2014 Dasgupta et al.
8,799,554 B1 8/2014 Vincent et al.
(Continued)

FOREIGN PATENT DOCUMENTS

WO 2010057775 5/2010
WO 2012170164 12/2012

OTHER PUBLICATIONS

Energy-Efficient Scheduling of Urgent Bag-of-Tasks Applications in Clouds through DVFS, by Rodrigo N. Calheiros and Rajkumar Buyya; 2014 IEEE 6th International Conference on Cloud Computing Technology and Science; The University of Melbourne, Australia, 2014, pp. 342-349.
(Continued)

*Primary Examiner* — Phil K Nguyen
(74) *Attorney, Agent, or Firm* — K&L Gates LLP

(57) ABSTRACT

A power consumption optimization system includes a virtual machine (VM) provisioned on a host, a memory, a server, and a processor in communication with the memory. The processor causes the server to store a power consumption profile of the VM. The VM runs at a processor frequency state. Additionally, the processor causes the server to receive a request to lower a processor frequency for the VM from an original processor frequency state to a reduced processor frequency state. The request has request criteria indicating a time duration associated with the request. The server validates the request criteria and a requirement of another tenant on the host. Responsive to validating the request criteria and the requirement the other tenant on the host, the server confirms the request to lower the processor frequency. Additionally, the server lowers the processor frequency to the reduced processor frequency state during the time duration.

20 Claims, 6 Drawing Sheets

(51) Int. Cl.
    *G06F 1/3287* (2019.01)
    *G06F 1/324* (2019.01)
    *G06F 9/455* (2018.01)
    *G06F 9/54* (2006.01)
    *G06F 9/50* (2006.01)
    *G06F 1/26* (2006.01)

(52) U.S. Cl.
    CPC ........ *G06F 9/45558* (2013.01); *G06F 9/5094* (2013.01); *G06F 9/54* (2013.01); *G06F 1/26* (2013.01); *G06F 2009/4557* (2013.01); *G06F 2009/45579* (2013.01); *G06F 2009/45591* (2013.01); *G06F 2009/45595* (2013.01)

(56) References Cited

U.S. PATENT DOCUMENTS

| | | |
|---|---|---|
| 8,862,914 B2 | 10/2014 | Kansal et al. |
| 9,590,879 B2 | 3/2017 | Wray |
| 2005/0160151 A1 | 7/2005 | Rawson |
| 2005/0268078 A1 | 12/2005 | Zimmer et al. |
| 2007/0234357 A1* | 10/2007 | Grobman .............. G06F 9/5077 718/1 |
| 2008/0250415 A1* | 10/2008 | Illikkal ................. G06F 9/5077 718/103 |
| 2009/0187776 A1* | 7/2009 | Baba .................... G06F 1/3203 713/320 |
| 2011/0154353 A1 | 6/2011 | Theroux et al. |
| 2011/0289330 A1 | 11/2011 | Gao et al. |
| 2012/0016721 A1 | 1/2012 | Weinman |
| 2014/0006820 A1 | 1/2014 | McKenney |
| 2014/0229750 A1 | 8/2014 | Bhandaru et al. |
| 2015/0220371 A1 | 8/2015 | Yang et al. |
| 2016/0062438 A1* | 3/2016 | Das ....................... G06F 1/3206 713/322 |
| 2016/0196157 A1* | 7/2016 | Kodama ............. G06F 9/45558 718/1 |
| 2017/0199564 A1* | 7/2017 | Saxena ................. G06F 1/3296 |
| 2018/0276038 A1* | 9/2018 | Malik ................... G06F 9/4856 |

OTHER PUBLICATIONS

Self-Adaptive Consolidation of Virtual Machines For Energy-Efficiency in the Cloud, by Guozhong Li, Yaqiu Jiang, Wutong Yang, and Chaojie Huang, School of Information and Software Engineering, University of Electronic Science and Technology of China, Apr. 15, 2016, 7 pages.

* cited by examiner

POWER CONSUMPTION OPTIMIZATION ON THE CLOUD

CROSS REFERENCES TO RELATED APPLICATIONS

This application is a continuation of and claims priority to and the benefit of U.S. patent application Ser. No. 15/649,104, filed on Jul. 13, 2017, the entire content of which is hereby incorporated by reference.

BACKGROUND

Computer systems may run applications and processes that execute various instructions on a processor. Processors may execute instructions at various performance levels based on the processors frequency and/or the voltage supplied to the processor. For example, processors may operate at a specified power state or P-state, which may be a defined frequency voltage pair for that processor. The power consumption, and therefore, the operating costs associated with running applications on the cloud may be directly linked to the P-state of the processors used to execute tasks and commands associated with the applications. For example, each P-state may have a designated operating cost or price per hour. High performance power states have higher frequencies and voltages than lower performance power states, but due to the higher voltage, these higher performance power states may consume more power and thus are associated with higher operating costs.

SUMMARY

The present disclosure provides new and innovative systems and methods for power consumption optimization on the cloud. In an example, a system includes a virtual machine (VM) provisioned on a host, a memory, a server, and at least one processor in communication with the memory. The at least one processor causes the server to store a power consumption profile of the virtual machine provisioned on the host. The virtual machine provisioned on the host runs at a processor frequency state. Additionally, the at least one processor causes the server to receive a request to lower a processor frequency for the virtual machine from an original processor frequency state to a reduced processor frequency state. The request has request criteria indicating a time duration associated with the request. The at least one processor also causes the server to validate the request criteria, validate at least one requirement of at least one other tenant on the host, and responsive to validating the request criteria and the at least one requirement of the at least one other tenant on the host, confirm the request to lower the processor frequency. Additionally, the server lowers the processor frequency to the reduced processor frequency state during the time duration.

In an example, a method includes storing, by a server, a power consumption profile of a virtual machine provisioned on a host. The virtual machine provisioned on the host runs at a processor frequency state. Additionally, the server receives a request to lower a processor frequency for the virtual machine from an original processor frequency state to a reduced processor frequency state. The request has request criteria indicating a time duration associated with the request. The server validates request criteria and at least one requirement of at least one other tenant on the host. Responsive to validating the request criteria and the at least one requirement of the at least one other tenant on the host, the server confirms the request to lower the processor frequency. Additionally, the server lowers the processor frequency to the reduced processor frequency state during the time duration.

In an example, a non-transitory machine readable medium stores code, which when executed by a processor, causes a server to store a power consumption profile of a virtual machine provisioned on a host. The virtual machine provisioned on the host to run at a processor frequency state. The server receives a request to lower a processor frequency for the virtual machine from an original processor frequency state to a reduced processor frequency state. The request has request criteria indicating a time duration associated with the request. The server also validates the request criteria and at least one requirement of at least one other tenant on the host. Responsive to validating the request criteria and the at least one requirement of the at least one other tenant on the host, the server confirms the request to lower the processor frequency. Additionally, the server lowers the processor frequency to the reduced processor frequency state during the time duration.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
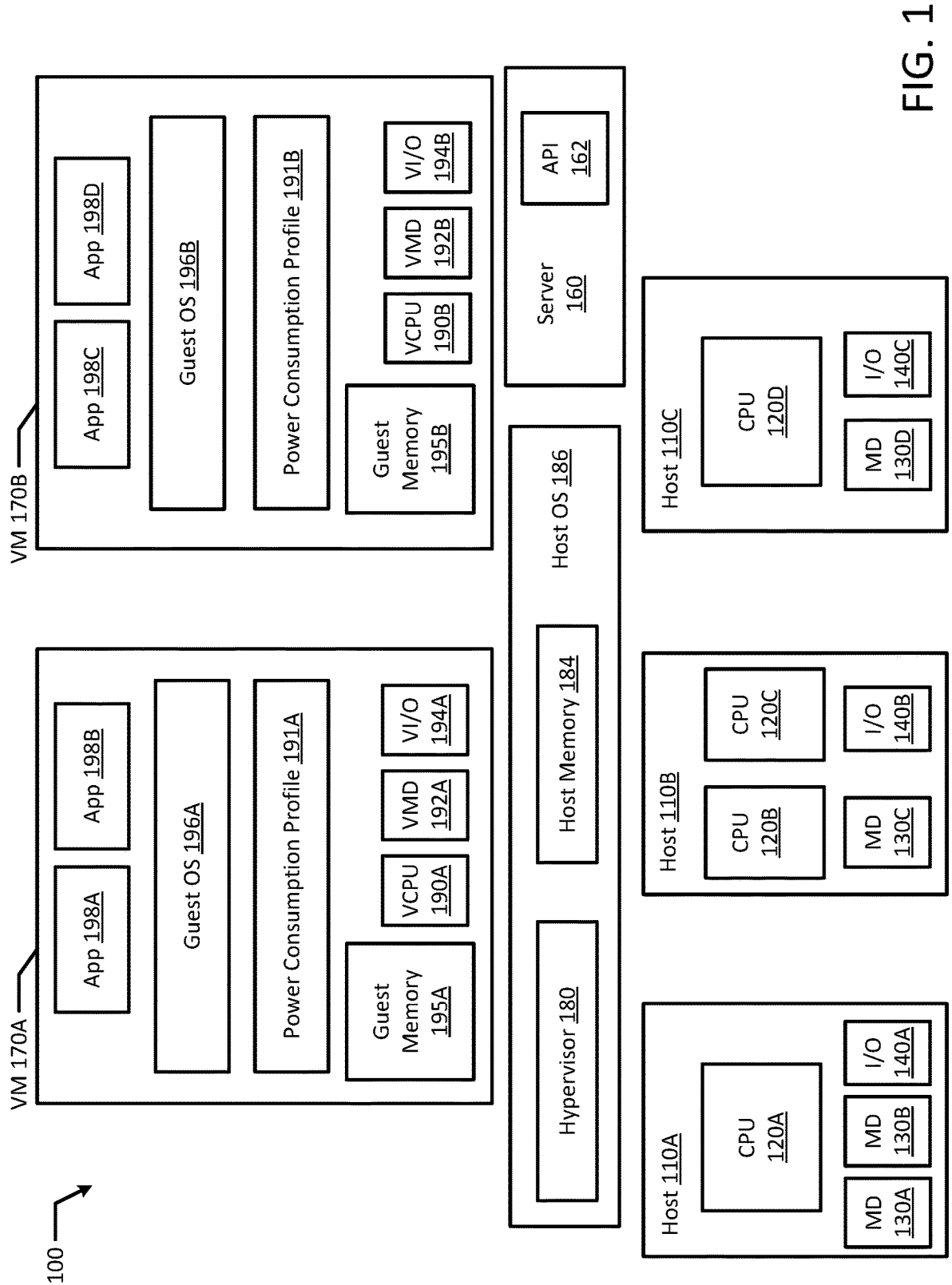
FIG. 1 illustrates a block diagram of an example cloud computing system according to an example embodiment of the present disclosure.

Techniques are disclosed for providing power consumption optimization on the cloud. Currently, techniques of reducing processor frequency at runtime are typically used in mobile and desktop devices. For example, frequency scaling may typically involve monitoring battery capacity or system temperature and reducing processor performance (e.g., frequency and/or voltage) to increase battery life, reduce heat output, and/or allow quieter operation of the system (e.g., system cooling fans may be throttled down or turned off thereby reducing noise levels). However, due to technical and scheduling limitations, neither public cloud nor private cloud products provide mechanisms or incentives for applications to scale processor (e.g., CPU) frequencies to adjust power consumption. Typically, a cloud user pays a cloud provider for a set range of performance or power state, which may be a locked range (e.g., the operating cost to the cloud user is the same even if the user uses scales frequency down and consumes less power). Because operating costs are typically locked for cloud users, the cloud users currently are not incentivized to reduce power consumption of applications and services on the cloud. A cloud provider is a company that offers some component of cloud computing, typically infrastructure as a service (IaaS), software as a service (SaaS), or platform as a service (PaaS) to cloud users. A cloud provider may also be referred to as a cloud service provider.

As discussed in the various example embodiments disclosed herein, to improve efficiency and conserve resources (e.g., power consumption) for systems with varying processor capabilities, a power consumption optimization system may receive and store power consumption profiles from cloud users, which indicate power consumption requirements of a virtual machine provisioned on a host. The power consumption profile may indicate the range of frequencies that are acceptable for the virtual machine. Then, the virtual machine may be provisioned on an appropriate host (e.g., a host capable of operating in the processor frequency range required by the virtual machine). Cloud users may submit requests to the cloud provider to lower a processor frequency for the virtual machine (e.g., application or service running on virtual machine) from an original frequency to a reduced frequency during a specific time period. For example, a cloud user may provide and/or use a cloud application mainly during working hours, but the application may not receive as much traffic outside of work hours, and a lower processor frequency (and thus lower power consumption) may be capable of handling the workload for the application during that time. Due to this decreased workload outside of work hours, the cloud user may submit the request to reduce the frequency during this time period, and in the request they may include a range of acceptable incentives, such as a cloud credit demand.

Then, the request may be validated if the host is capable of operating at the requested processor frequency range, the request is compatible with other tenants (e.g., virtual machines) on the host, and the incentive (e.g., cloud credit demand) is reasonable. For example, the cloud credit demand may be reasonable if it is within an operating cost difference between instance types that run close to the target or requested CPU frequency and the current instance type. For example, a request to lower CPU frequency from a power state or P-state P0 to 2 may be validated if the incentive or demand is within the cost difference of P0 and P2. After the request is validated, the request may be honored or confirmed and the cloud user may receive cloud credits. Cloud credits may be used to scale-up CPU frequency, for example, when a cloud user experiences a spike in demand due to an unexpected or forecasted increase in workload.

Instead of the processor constantly operating at the same frequency thereby wasting computer resources and consuming additional power during low demand periods and failing to meet workload demands during spikes in application traffic, the cloud user may request to reduce processor frequency to a lower frequency state during certain time periods to obtain cloud credits which may be used to increase processor performance during demand spikes, which advantageously allows the processor to optimally complete task under various workload conditions. Reducing the processor frequency advantageously conserves resources, improves the efficiency of the processor, reduces power consumption, decreases heat generation, and may extend the life of a hardware processor and/or reduce requirements for external cooling of hardware (e.g., in a datacenter).

FIG. 1 depicts a high-level component diagram of an example cloud computing system 100 in accordance with one or more aspects of the present disclosure. The cloud computing system 100 may include an operating system (e.g., host OS 186), one or more virtual machines (VM 170A-B), hosts (e.g., hosts 110A-C), a server 160, and a hypervisor (e.g., hypervisor 180).

The server 160 may include an application program interface (API) 162. In an example, the server 160 may serve as an interface between a cloud user (e.g., user implementing virtual machines 170A-B on the cloud) and a cloud provider. The server 160 may store power consumption profiles 191A-B received from cloud users. The server 160 may also receive request from cloud users to lower a processor frequency or power state for the virtual machine (e.g., lower the processor frequency of the host 110 that the virtual machine 170A-B is provisioned on). The request may indicate a target reduced processor frequency state, a start time for the request, and a time period associated with the request (e.g., reduce processor frequency to 2.13 GHz at 7 p.m. for six hours). The server 160 may also validate the request and lower the processor frequency. Requests may be in the form of an API call that is received by API 162 hosted on server 160.

Virtual machines 170A-B may include a guest OS, guest memory, a virtual CPU (VCPU), virtual memory devices (VMD), and virtual input/output devices (VI/O). For example, virtual machine 170A may include guest OS 196A, guest memory 195A, a virtual CPU 190A, a virtual memory devices 192A, and virtual input/output device 194A. Guest memory 195A may include one or more memory pages. Similarly, virtual machine 170B may include guest OS 196B, guest memory 195B, a virtual CPU 190B, a virtual memory devices 192B, and virtual input/output device 194B. Guest memory 195B may include one or more memory pages. Each virtual machine 170A-B may also include a power consumption profile 191A-B respectively. In an example, the power consumption profile 191A-B may indicate whether the virtual machine 170A-B can be provisioned on a host 110 that allows frequency scaling. Additionally, the power consumption profile 191A-B may indicate acceptable frequency ranges, power levels, or other operation parameters for the virtual machine 170A-B. In another example, the power consumption profile 191A-B may indicate whether the virtual machine 170A-B may be migrated to different hosts. Similarly, the indication whether a virtual machine 170A-B may be migrated to different hosts may be included in the request received from the cloud user.

The hypervisor 180 may manage host memory 184 for the host operating system 186 as well as memory allocated to the virtual machines 170A-B and guest operating systems 196A-B such as guest memory 195A-B provided to guest OS 196A-B. Host memory 184 and guest memory 195A-B may be divided into a plurality of memory pages that are managed by the hypervisor 180. Guest memory 195A-B allocated to the guest OS 196A-B may be mapped from host memory 184 such that when a guest application 198A-B uses or accesses a memory page of guest memory 195A-B, the guest application 198A-B is actually using or accessing host memory 184.

In an example, a virtual machine 170A may execute a guest operating system 196A and run applications 198A-B which may utilize the underlying VCPU 190A, VMD 192A, and VI/0 device 194A. One or more applications 198A-B may be running on a virtual machine 170A under the respective guest operating system 196A. A virtual machine (e.g., VM 170A-B, as illustrated in FIG. 1) may run on any type of dependent, independent, compatible, and/or incompatible applications on the underlying hardware and OS. In an example, applications (e.g., App 198A-B) run on a virtual machine 170A may be dependent on the underlying hardware and/or OS 186. In another example embodiment, applications 198A-B run on a virtual machine 170A may be independent of the underlying hardware and/or OS 186. For example, applications 198A-B run on a first virtual machine 170A may be dependent on the underlying hardware and/or OS 186 while applications (e.g., application 198C-D) run on a second virtual machine (e.g., VM 170B) are independent of the underlying hardware and/or OS 186A. Additionally, applications 198A-B run on a virtual machine 170A may be compatible with the underlying hardware and/or OS 186. In an example embodiment, applications 198A-B run on a virtual machine 170A may be incompatible with the underlying hardware and/or OS 186. For example, applications 198A-B run on one virtual machine 170A may be compatible with the underlying hardware and/or OS 186A while applications 198C-D run on another virtual machine 170B are incompatible with the underlying hardware and/or OS 186. In an example embodiment, a device may be implemented as a virtual machine (e.g., virtual machine 170A-B).

The cloud computer system 100 may include one or more hosts 110A-C or nodes. Each host 110A-C may in turn include one or more physical processors (e.g., CPU 120A-D) communicatively coupled to memory devices (e.g., MD 130A-C) and input/output devices (e.g., I/O 140A-C). Each host 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Virtual machines 170A-B may be provisioned on the same host (e.g., host 110A) or different hosts. For example, VM 170A and VM 170B may both be provisioned on host 110A. Alternatively, VM 170A may be provided on host 110A while VM 170B is provisioned on host 110B.

As used herein, physical processor or processor 120A-D refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-D refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors 120A-D may be interconnected using a variety of techniques, ranging from a point-to-point processor interconnect, to a system area network, such as an Ethernet-based network. Local connections within each node, including the connections between a processor 120A-D and a memory device 130A-D may be provided by one or more local buses of suitable architecture, for example, peripheral component interconnect (PCI).

Figure 2:
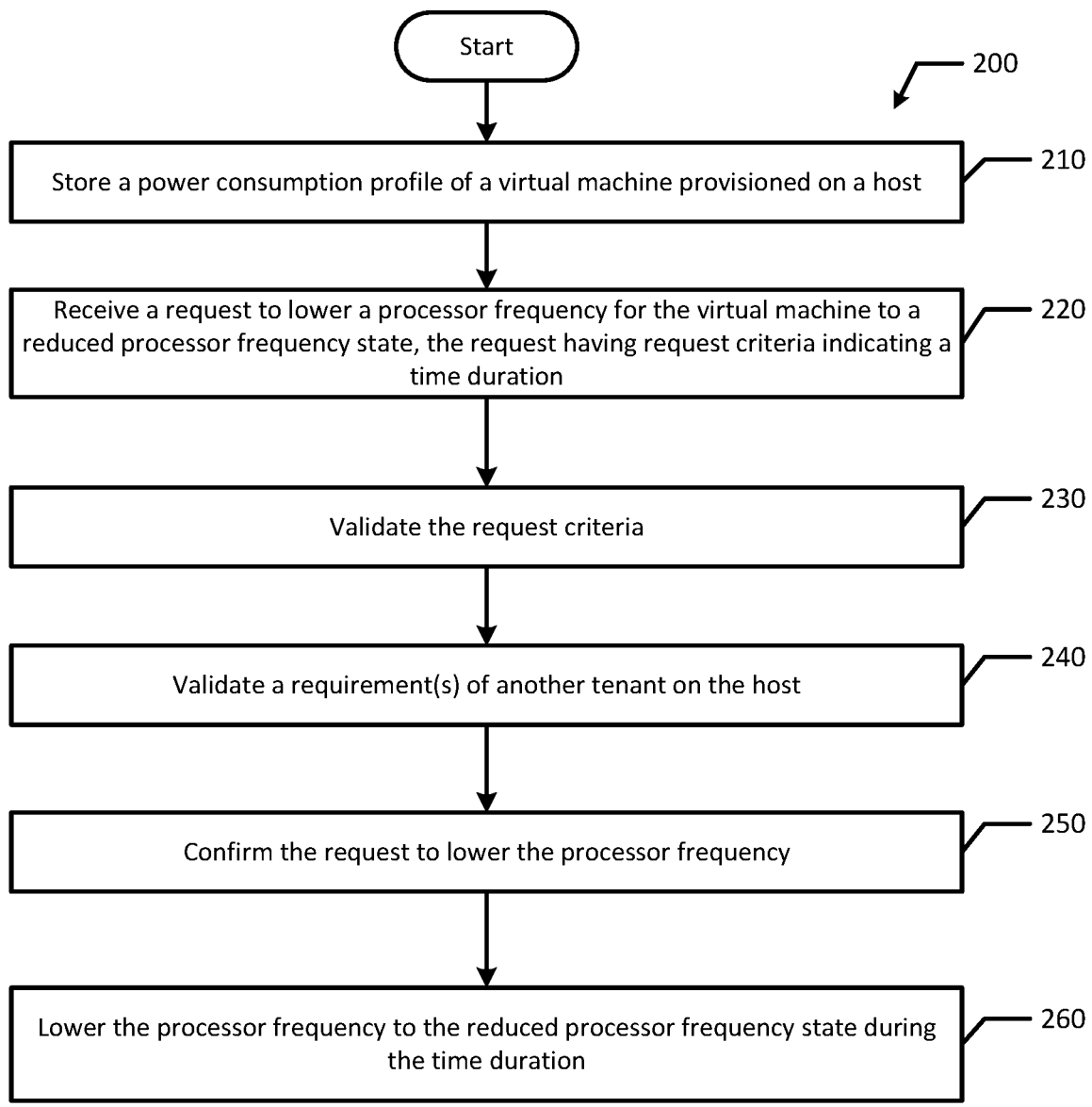
FIG. 2 illustrates a flowchart of an example process for power consumption optimization according to an example embodiment of the present disclosure.

FIG. 2 illustrates a flowchart of an example method 200 for power consumption optimization on the cloud in accordance with an example embodiment of the present disclosure. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, and some of the blocks described are optional. The method 200 may be performed by processing logic that may comprise hardware (circuitry, dedicated logic, etc.), software, or a combination of both.

The example method 200 includes storing a power consumption profile of a virtual machine provisioned on a host (block 210). For example, power consumption profile 191A of virtual machine 170A may be stored in memory (e.g., host memory 184 and/or memory device 130A-D) associated with the host (e.g., host 110A) that the virtual machine 170A is provisioned on to run at a processor frequency state. In an example, a cloud user may provide the power consumption profile 191A associated with virtual machine 170A to a cloud provider through a server 160. Then, the server may receive a request to lower a processor frequency for the virtual machine to a reduced processor frequency state, the request having request criteria indicating a time duration (block 220). For example, after the virtual machine 170A is provisioned on host 110A, the server 160 may receive a request from a cloud user to lower a processor frequency (e.g., frequency of CPU 120A) from an original processor frequency state to a reduced frequency state for the virtual machine 170A. The request may have request criteria indicating a time duration associated with the request. In an example, requests to lower the processor frequency may be requests to reduce the power state or P-state of the virtual machine 170A and/or application 198A-B.

A power state or P-state is a voltage-frequency pair that set the speed and power consumption of a processor. For example, when the operating voltage of the processor is lower, the power consumption is also lower. Additionally, frequency may be lowered in tandem with the voltage, such that lower frequency results in slower computation. Different hosts may support different ranges of P-states. For example, a host may support P-states P0 to P3 (e.g., host is capable of operating the processor at P-states P0 to P3). In an example, P-states may be numbered starting from P0 (the highest performance setting) and may go to P15 (the lowest possible processor frequency). P0 may consume the maximum power, and have the maximum performance. Each successive P-state may consume less power, but respectively have less performance. For example, the performance and power consumption of P0 is greater than P1 (i.e., P0>P1). Similarly, P1>P2, and so on such that the performance, processor frequency, and power consumption of P(n−1)>Pn. In an example, P0 may be 2.50 GHz at 1.425V, P1 may be 2.31 GHz at 1.4125V, P2 may be 2.13 GHz at 1.1875V, P3 may be 1.83 GHz at 1.262V, P4 may be 1.52 GHz at 1.1625V, P5 may be 1.22 at 1.0625 V, P6 may be 0.91 GHz at 0.9375V, etc. In other examples, the P-states may have different incremental ranges, such as P0 to P4. Additionally, the P-states for each host 110 may be different depending on the hardware and/or firmware on the host 110. For example, P1 on host 110A may be a different frequency-voltage pair than P1 on host 110B. In an alternative example, P0 may be the lowest frequency and performance and Pn may be the highest frequency and performance.

The server may validate the request criteria (block 230). In an example, the server 160 may validate the request criteria by checking whether the host 110A and the associated processor (e.g., CPU 120A) are capable of operating at the requested frequency. For example, CPU 120A may be capable of operating between P-states P0 (e.g., 2.50 GHz) to P3 (e.g., 1.83 GHz), and thus a request to lower the process frequency below 1.83 GHz may not be possible on host 110A. In such an event, the server 160 may determine that the request criteria fails validation. In an example, when the request fails validation, the server 160 may reject the request. For example, the server 160 may send a notification to the cloud user that the request has been rejected. In an example, the cloud user may receive a notification from the cloud provider that the request has been rejected.

In another example, validating the request criteria may include checking the requested time frame or time duration for lowering the processor frequency against the current host processor schedule. For example, host 110A may have a predetermined processor schedule to operate at P-state P0 from 5 a.m. to 10 p.m. eastern time and then switch to P-state P1 from 10 p.m. to 5 a.m. the following day. Thus, a request to change the P-state below P0 between the hours of 5 a.m. and 10 p.m. may be denied because the requested time frame conflicts with the pre-existing schedule on host 110A.

In another example, validating the request criteria may include comparing the request to other requests received by different tenants (e.g., virtual machine 170B) provisioned on host 110A. For example, the server 160 may deny requests due to previous commitments from other requests (e.g., the P-state or time frame of the current request conflicts with those of a previously received request). In an example, requests may be handled on a first come-first serve basis. Requests may also be prioritized based on power savings. For example, requests resulting in the largest power savings may be given priority. In another example, requests that are most profitable to the cloud provider may be given priority. For example, requests with low incentive demands may be processed first since the cloud provider would advantageously consume less power while reducing the cloud credits or incentives it distributes to cloud users.

Then, the server may validate requirement(s) of another tenant on the host (block 240). For example, the server 160 may determine that other tenants (e.g., virtual machine 170B) on host 110A are not negatively impacted by the request. In an example, processor frequency scaling may affect all CPU cores on host 110A and tenants residing on the same host 110A may be impacted if the processor (e.g., CPU 120A) scales to a lower frequency or power-state. For example, if the power consumption profile for VM 170B indicates that the P-state must be between P0 and P2, then the server 160 may deny a request to reduce the processor frequency to 1.83 GHz for a power state of P3 because that frequency is outside of the frequency ranges of the other tenants (e.g., VM 170B) on host 110A. However, if the request was to reduce the processor frequency from P0 to P1 (e.g., 2.31 GHz), then the server 160 may validate the requirements indicated by the power consumption profile 191B of VM 170B because the reduced power state is within the acceptable range for the other tenant (e.g., VM 170B).

Next, the server may confirm the request to lower the processor frequency (block 250). For example, responsive to validating the request criteria and requirement(s) of other tenants on the host, the server 160 may confirm or accept the request to lower the processor frequency. In an example, the server 160 may send a confirmation or notification to the cloud user. Additionally, the server 160 may notify the cloud provider that the request has been accepted, and the cloud provider may forward the notification to the cloud user. Then, the server may lower the processor frequency to the reduced processor frequency state during the time duration (block 260). For example, the server 160 may lower the power state of the processor (e.g., CPU 120A), thereby lowering the frequency and power consumption during the requested time duration (e.g., 7 hours), which advantageously conserves system resources by consuming less power. Additionally, the cloud user may be credited a cloud credit for reducing power consumption, which may be used later to increase CPU performance to a high performance P-state (e.g., P0) when experiencing a spike in traffic or a forecasted increase in workload (e.g., release of a new application feature or by adding additional users on the application). The cloud credits advantageously provide an incentive to cloud users to conserve energy and allow cloud users to scale-up processor performance in times of need such that the processor is optimized for performance and power consumption throughout the day.

Figure 3A:
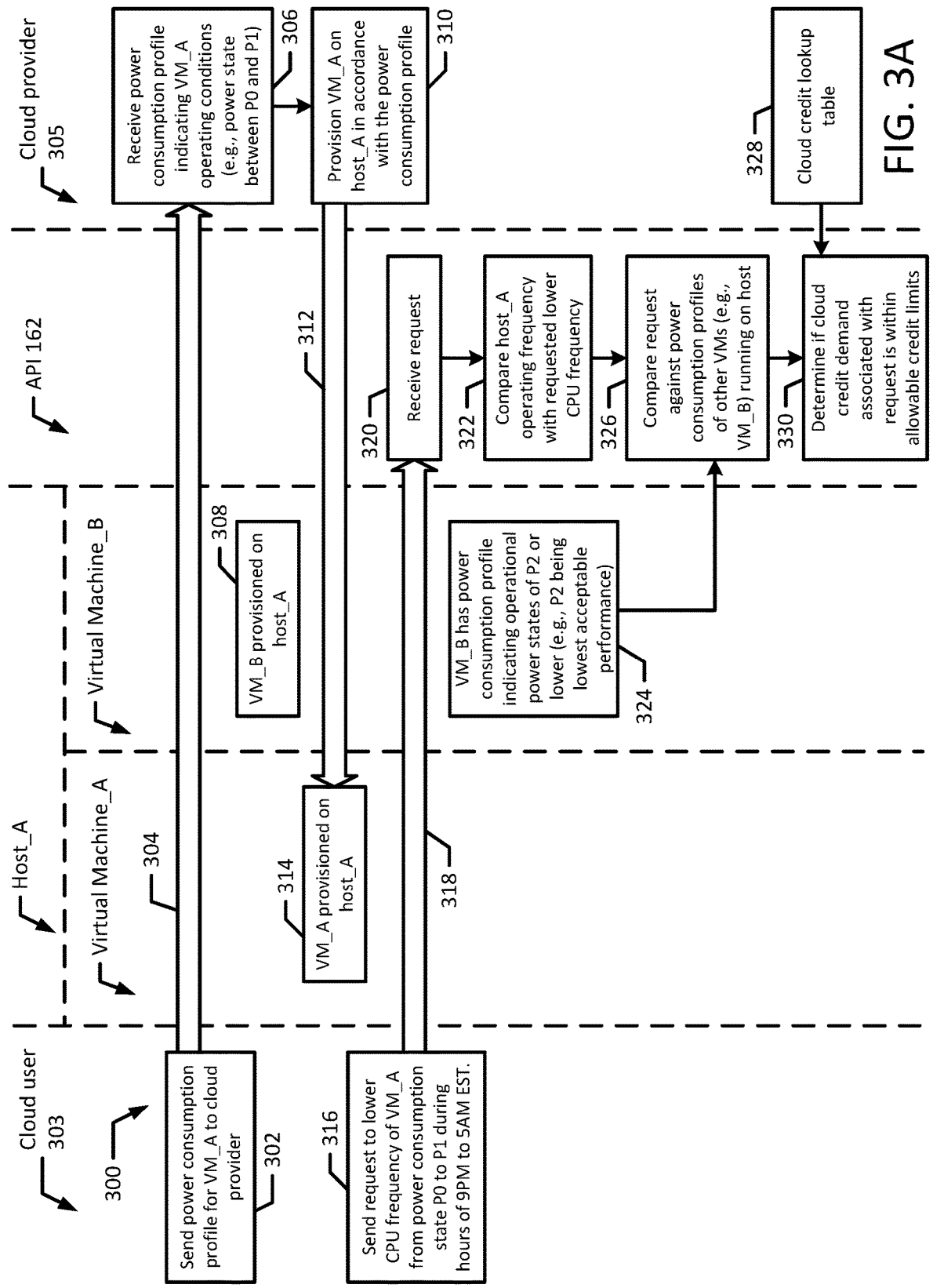
FIGS. 3A, 3B, and 3C illustrate a flow diagram of an example process for power consumption optimization on the cloud according to an example embodiment of the present disclosure.
Figure 3B:
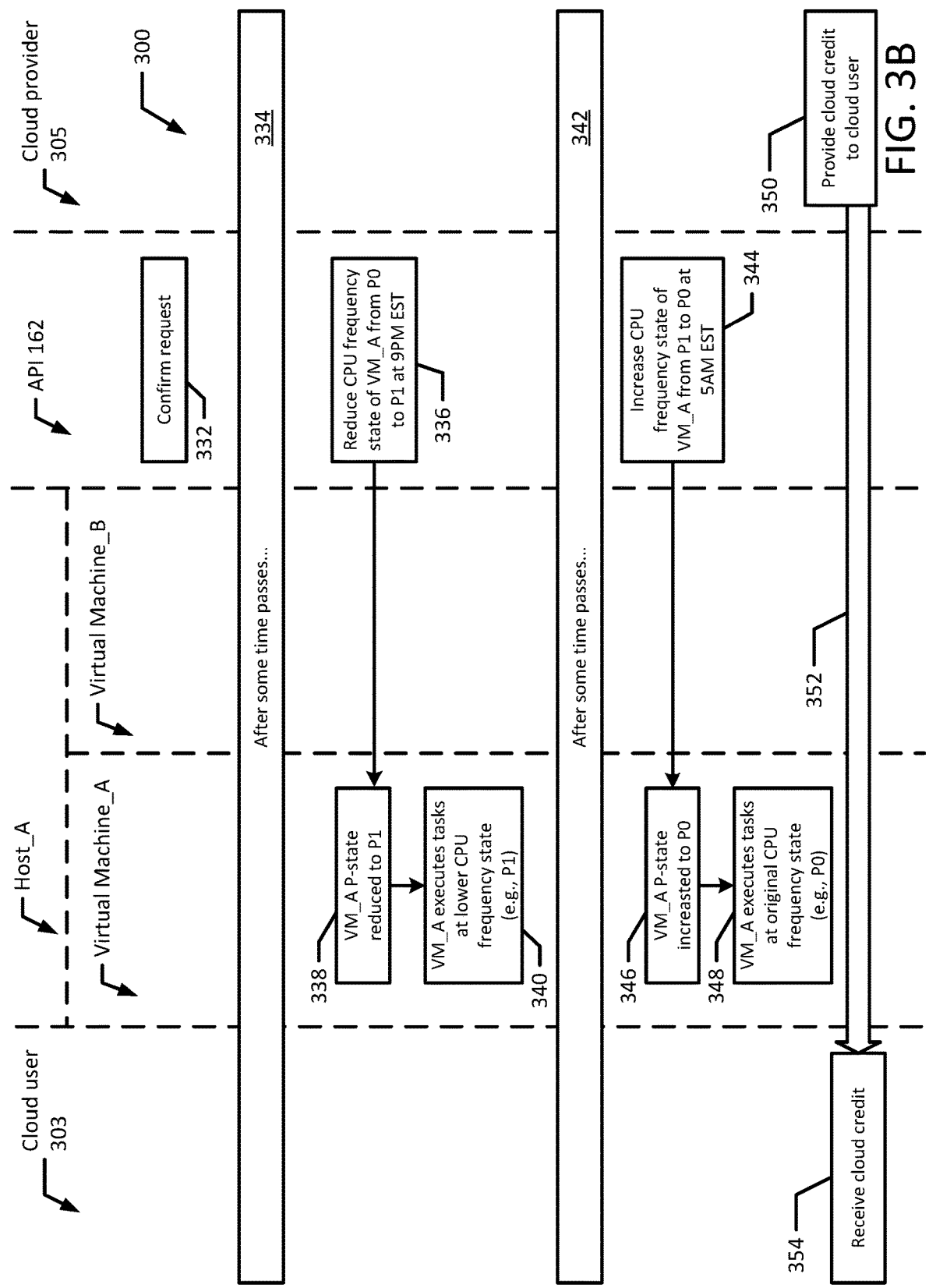
Figure 3C:
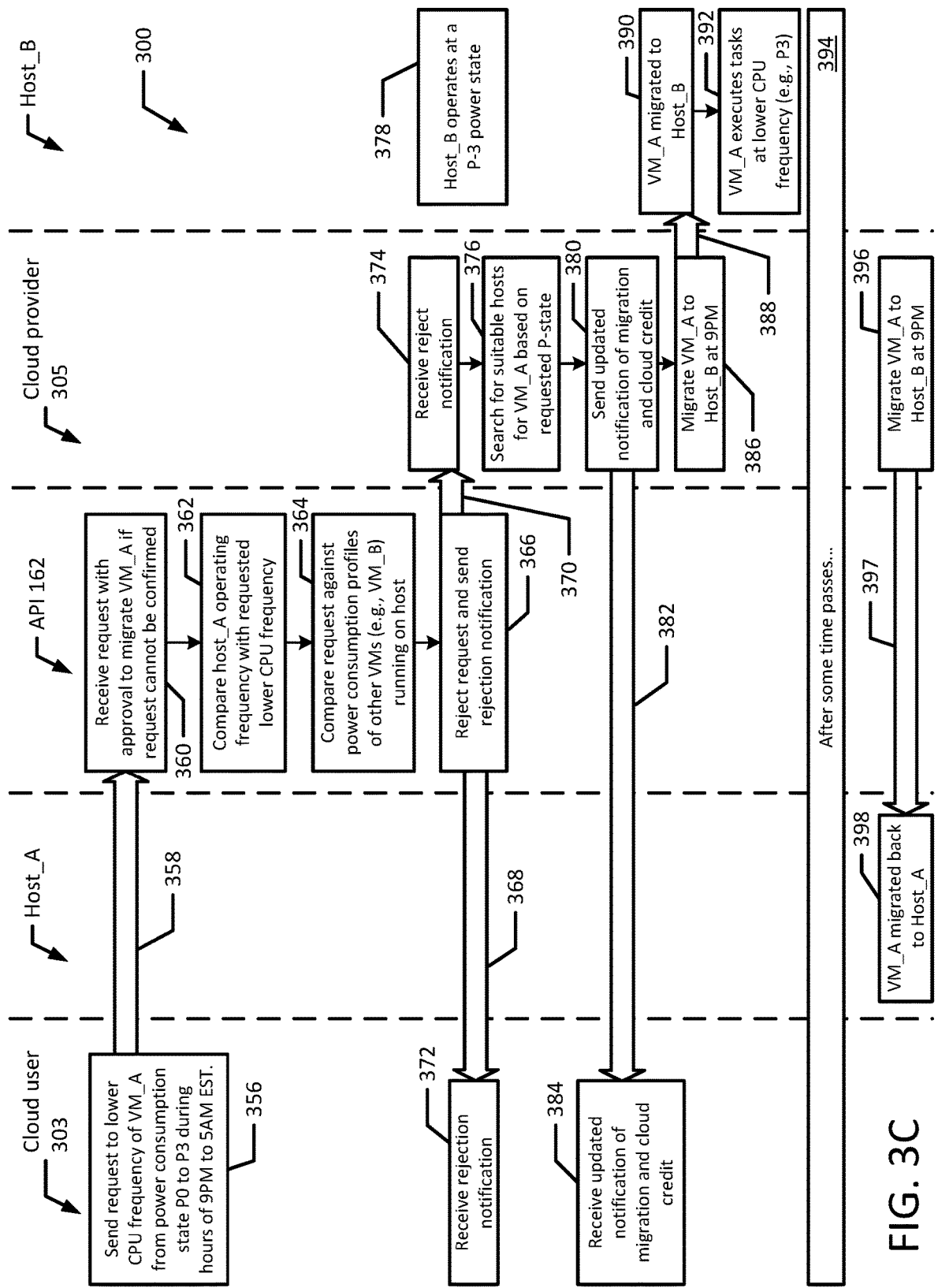

FIGS. 3A, 3B and 3C illustrate a flowchart of an example method 300 for power consumption optimization in the cloud in accordance with an example embodiment of the present disclosure. Although the example method 300 is described with reference to the flowchart illustrated in FIGS. 3A, 3B and 3C, it will be appreciated that many other methods of performing the acts associated with the method 300 may be used. For example, the order of some of the blocks may be changed, certain blocks may be combined with other blocks, and some of the blocks described are optional. For example, a cloud user 303 and a cloud provider 305 may communicate with an API 162 and virtual machines 170 (e.g., VM_A and VM_B) on a host 186 (e.g., Host_A) to perform example method 300.

In the illustrated example, the cloud user 303 may send a power consumption profile 191A for a specific virtual machine 170 (e.g., VM_A) to a cloud provider 305 (blocks 302 and 304). In an example, the power consumption profile 191A may indicate whether the virtual machine 170 can be provisioned on a host 110 that allows frequency scaling. Additionally, the power consumption profile 191A may indicate acceptable frequency ranges, power levels, or other operation parameters for the virtual machine 170. Then, the cloud provider 305 may receive the power consumption profile 191A indicating VM_A operating conditions (block 306). For example, the power consumption profile 191A may indicate that frequency scaling is allowed for VM_A with operational power states between power state P0 and power state P1.

Other tenants may also have virtual machines provisioned on host_A. In the illustrated example, VM_B may be provisioned on host_A (block 308). For example, the cloud provider 305 may have provisioned VM_B on host_A because the power consumption profile 191B of VM_B indicated that frequency scaling is allowed for VM_B. Additionally, the power consumption profile 191B of VM_B may indicate that VM_B requires a power state of at least 2 (e.g., VM_B should be provisioned on a host with a processor power state of P0, P1, or P2). After receiving the power consumption profile 191A, the cloud provider 305 may provision VM_A on host_A in accordance with the profile 191A (blocks 310 and 312). In an example, the cloud provider 305 may find a host 110 that best matches the cloud user's 303 power consumption profile 191A. For example, host_A may have frequency scaling enabled and may operate at the desired power states (e.g., processor frequency ranges) of VM_A, and the cloud provider 305 may provision VM_A on host_A since the properties of host_A align with the requirements of VM_A' s power consumption profile. Then, VM_A is provisioned on host_A (block 314). For example, the cloud provider 305 may instruct a hypervisor 180 to provision VM_A on host_A. In an example, VM_A may run on host_A at a P0 power state (e.g., 2.50 GHz) After provisioning, the VM_A may run applications (e.g., applications 198A-B) on the cloud managed by server 160.

A cloud user 303 may send a request to lower CPU frequency of VM_A from power consumption state P0 to P1 during the hours of 9 p.m. and 5 a.m. eastern time (blocks 316 and 318). For example, the cloud user 303 may provide an employee social network application (e.g., application 198A-B) on the cloud for employees to share work documents and participate in video conferences at work. The company may experience reduced traffic on the social network application outside of work hours (e.g., in the evening and into the night until the start of the following workday), and therefore a lower processor frequency (and thus lower power consumption) may be capable of handling the workload for the application. Due to the expected decrease in traffic at night, the cloud user 303 may request to lower the CPU frequency during that time period (e.g., between 9 p.m. and 5 a.m. eastern time). In an example, the request may be an API call that is sent to an API 162 hosted on server 160. For example, during runtime, the cloud user 303 using virtual machines (e.g., VM_A) on a higher clocked CPU (e.g., CPU 120A on Host_A) may issue a new cloud VM API call to the cloud provider 305. The API call may be and http request (e.g., GET, POST, PUT, etc.). Then, the API 162 may receive the request (block 320). In an example, the request may be recurring (e.g., request occurs at 8 p.m. every day). Additionally, the request may be a one-time request. The request may include a target lower CPU frequency (e.g., 2.31 GHz) at a future time (e.g., 9 p.m.) for a specified duration (e.g., 8 hours). The request may also include a range of incentives, such as cloud credits, the cloud user 303 is willing to accept if the request is honored or confirmed.

In another example, the request may include an indication that virtual machine (e.g., VM_A) and/or application instances (e.g., applications 198A-B) can be migrated to a host 110 with a lower CPU frequency if the request is not validated for host_A. For example, to reduce power consumption and receive an incentive, such as a cloud credit, the cloud user 303 may authorize the cloud provider 305 to migrate the VM_A and/or associated application instances 198A-B to a different host 110 operating at the target CPU frequency (e.g., 2.31 GHz). In an example, after the specified duration, VM_A may be migrated back to host_A such that it can continue performing at its original power state after the specified duration of time in the request.

After receiving the request, the API 162 may compare host_A's operating CPU frequency with the requested lower CPU frequency (block 322). For example, host_A may be capable of operating between P-states P0 and 2 (e.g., 2.50 GHz and 2.13 GHz), which may be compared against the requested target frequency of 2.31 GHz associated with P-state P1. Each tenant (e.g., virtual machine) on host_A may be associated with its own power consumption profile. VM_B may have a power consumption profile 191B indicating acceptable operation power states of 2 or lower (e.g., 2 to P0, where 2 is the lowest acceptable performance for VM_B) (block 324). For example, the power consumption profile of 191B may indicate that frequency scaling is allowed and VM_B requires a CPU frequency range between 2.50 GHz and 2.13 GHz. Then, the API 162 may compare the request against power consumption profiles (e.g., power consumption profile 191B) of other virtual machines (e.g., VM_B) running on host_A (block 326). For example, the server 160 and/or API 162 may compare the request against the power consumption profile of VM_B to determine whether the request conflicts with the power consumption profile 191B of VM_B.

In the illustrated example, the cloud provider 305 may have a cloud credit lookup table (block 328). For example, cloud provider 305 may store acceptable incentive ranges in a cloud credit lookup table that may be used to determine whether an incentive request is reasonable. For example, the lookup table may indicate the cost differences between power states and/or frequencies. The API 162 may determine if a cloud credit demand associated with the request is within allowable credit limits (block 330). For example, the API 162 may determine if the cloud credit demand is within allowable credit limits defined by the cloud credit lookup table by comparing the demanded value to the cost figures in the lookup table. For example, a request to lower CPU frequency from P0 to P1 may be validated if the incentive request is within the cost difference between P0 and P1.

Then, after validating the request, the API 162 may confirm the request (block 332). For example, if all the request criteria are confirmed against the respective parties (e.g., host_A, cloud provider 305, tenants such as VM_B) the API 162 and/or server 160 may confirm or honor the request. Then, some time may pass (block 334). For example, if the request was confirmed at 3 p.m., then VM_A may continue operating at its current power state P0 until the requested time (e.g., 9 p.m.) to reduce the frequency. The API 162 may reduce the CPU frequency state of VM_A from P0 to P1 at 9 p.m. eastern time (block 336). For example, the server 160 and/or API 162 may instruct host_A to operate at power state P1 at 9 p.m. such that the CPU frequency is lowered from 2.5 GHz to 2.31 GHz to conserve power. Then, the power state of VM_A is reduced to P1 (block 338). Since VM_A is provisioned on host_A, the VM_A executes on the processor at the lower power state. VM_A may then execute tasks at the lower CPU frequency state (e.g., frequency associated with power state P1) (block 340). As discussed above, the cloud user's 303 employee social networking application is utilized less during the evening hours, VM_A may efficiently execute tasks at the lower CPU frequency state due to the decreased traffic, which advantageously conserves resources by reducing power consumption without negatively impacting the application's performance.

More time may pass (block 342). For example, the 8-hour duration between 9 p.m. and 5 a.m. associated with the request may pass with host_A operating at the reduced P-state. After the time period ends, API 162 may increase the CPU frequency state of VM_A from P1 to P0 at 5 a.m. eastern time (block 344). Then, the power state of VM_A is increased to P0 (block 346). Since VM_A is provisioned on host_A, the VM_A executes on the processor at the increased power state P0 (e.g., its original power state). VM_A may then execute tasks at the increased or original CPU frequency state (e.g., frequency associated with power state P0) (block 348). Since the cloud user's 303 social networking application for employees is utilized more frequently during work hours, VM_A may by scaled back up to an optimal performance P-state to execute tasks during high traffic time periods.

Then, the cloud provider 305 may provide a cloud credit to the cloud user 303 (blocks 350 and 352). In an example, a cloud credit may be used to increase processor performance for a given period of time, which advantageously allows a cloud user 303 to improve application performance for more demanding workloads to prevent application down time and improve an application user's experience. Then, the cloud user 303 may receive the cloud credit (block 354). For example, the cloud user 303 may receive and incentive, such as a cloud credit, which may be used to increase performance of VM_A or another virtual machine on the cloud to ensure that application instances are operating at the optimum power state to conserve resources by reducing power consumption and providing sufficient application performance to users.

The cloud user may submit another request to lower CPU frequency of VM_A from power consumption state P0 to P3 during the same time frame (e.g., 9 p.m. to 5 a.m.) the following day (blocks 356 and 358). In an example, the request may include an indication that VM_A may be migrated to a different host 110 to satisfy the target frequency indicated by the request. Then, API 162 may receive the request with an indication or approval to migrate VM_A to a different host 110 if the request cannot be confirmed (block 360). Then, the API 162 may compare host_A's operating CPU frequency with the requested lower CPU frequency (block 362). For example, as discussed above, host_A may be capable of operating between P-states P0 and 2 (e.g., 2.50 GHz and 2.13 GHz), which may be compared against the requested target frequency of 1.83 GHz associated with P-state P3.

As discussed above with reference to block 324, VM_B may have a power consumption profile 191B indicating acceptable operation power states of 2 or lower (e.g., 2 to P0, where 2 is the lowest acceptable performance for VM_B). Then, the API 162 may compare the request against power consumption profiles (e.g., power consumption profile 191B) of other virtual machines (e.g., VM_B) running on host_A (block 364). For example, the server 160 and/or API 162 may compare the request against the power consumption profile of VM_B to determine whether the request conflicts with the power consumption profile 191B of VM_B. Since the requested power state P3 conflicts with the power consumption profile 191B of VM_B (e.g., 2 to P0, where 2 is the lowest acceptable performance for VM_B) as well as the operating frequencies of host_A (e.g., P0 to P2), API 162 may reject the request and send rejection notifications to the cloud user 303 and the cloud provider 305 (blocks 366, 368 and 370). In an example, API 162 may reject the request after comparing the request against host_A's operating frequency and determining that the requested processor frequency (e.g., 1.83 GHz) is outside the operational frequency range of host_A. Additionally, the API 162 may reject the request solely due to the request being incompatible with the power consumption profile 191B of VM_B.

Then, the cloud user 303 may receive the rejection notification (block 372). For example, the cloud user 303 may receive a message that the request has been rejected. Addtionally, the cloud provider 305 may receive the rejection notification (block 374). In an example, the cloud provider 305 may forward the rejection notification to the cloud user 303. After receiving the rejection notification, the cloud provider 305 may search for suitable hosts 110 for VM_A based on the requested P-state (block 376). For example, the cloud provider 305 may compare hosts 110 against the requested target frequency (e.g., frequency associated with P3 power sate) to determine which host 110 is the best match for VM_A.

Host_B may be another resource on the cloud and may operate at a P3 power state (block 378). For example, host_B may run several virtual machines at 1.83 GHz and 1.262V associated with the P3 power state. After finding a suitable host, cloud provider 305 may send an updated notification of migration and a cloud credit to the cloud user 303 (blocks 380 and 382). For example, the cloud provider 305 may send a message to cloud user 303 indicating that VM_A is going to be migrated to a new host 110 along with an appropriate cloud credit for the change in power consumption. Then, the cloud user 303 may receive the updated notification of migration and the cloud credit associated with the migration (block 384). For example, the cloud user 303 may receive and incentive, such as a cloud credit once the migration is confirmed.

Due to the properties of host_B aligning with the request criteria (e.g., frequency state associated with P3), the cloud provider 305 may migrate VM_A to host_B at 9 p.m. (blocks 386 and 388). For example, the cloud provider 305 may instruct the hypervisor 180 to migrate VM_A to host_B. Then, VM_A is migrated to host_B (block 390). For example, hypervisor 180 may migrate VM_A from host_A to host_B. Since VM_A is now provisioned on host_B, VM_A executes on the processor at the reduced power state P3 (e.g., the operational power state of host_B) (block 392). As discussed above, the cloud user's 303 employee social networking application is utilized less during the evening hours, and the cloud user 303 may determine that VM_A can function optimally outside of normal working hours at a reduced frequency state of P3 instead of a reduced frequency state of P1 from their previous request. For example, VM_A may efficiently execute tasks at the lower CPU frequency state due to the decreased traffic, which advantageously conserves resources by reducing power consumption without negatively impacting the application's performance. In another example, VM_A may stay on host_B if host_B increases P-state during the day (e.g., increases P-state to P0 during the day). Also, VM_A may migrate to a new host other than host_A or host_B after the time duration associated with the request ends. For example, VM_A may migrate to host_C at 5 a.m. because host_A has additional tenants (e.g., virtual machines) provisioned on it and therefore no longer has enough available resources to run VM_A.

More time may pass (block 394). For example, the 8-hour duration between 9 p.m. and 5 a.m. associated with the request may pass with VM_A operating at the reduced P-state on host_B. After the time period ends, the cloud provider 305 may migrate VM_A back to host_A at 5 a.m. the following day (blocks 396 and 397). For example, the cloud provider 305 may initiate another migration back to host_A thereby increasing the CPU frequency state of VM_A from P3 to P0 at 5 a.m. eastern time. Then, VM_A is migrated back to host_A (block 398). In an example, when VM_A is migrated back to host_A, cloud provider 305 may provide a cloud credit to the cloud user 303, which may used to increase processor performance for a given period of time, which advantageously allows the cloud user 303 to improve application performance for more demanding workloads to prevent application down time and improve an application user's experience.

Figure 4:
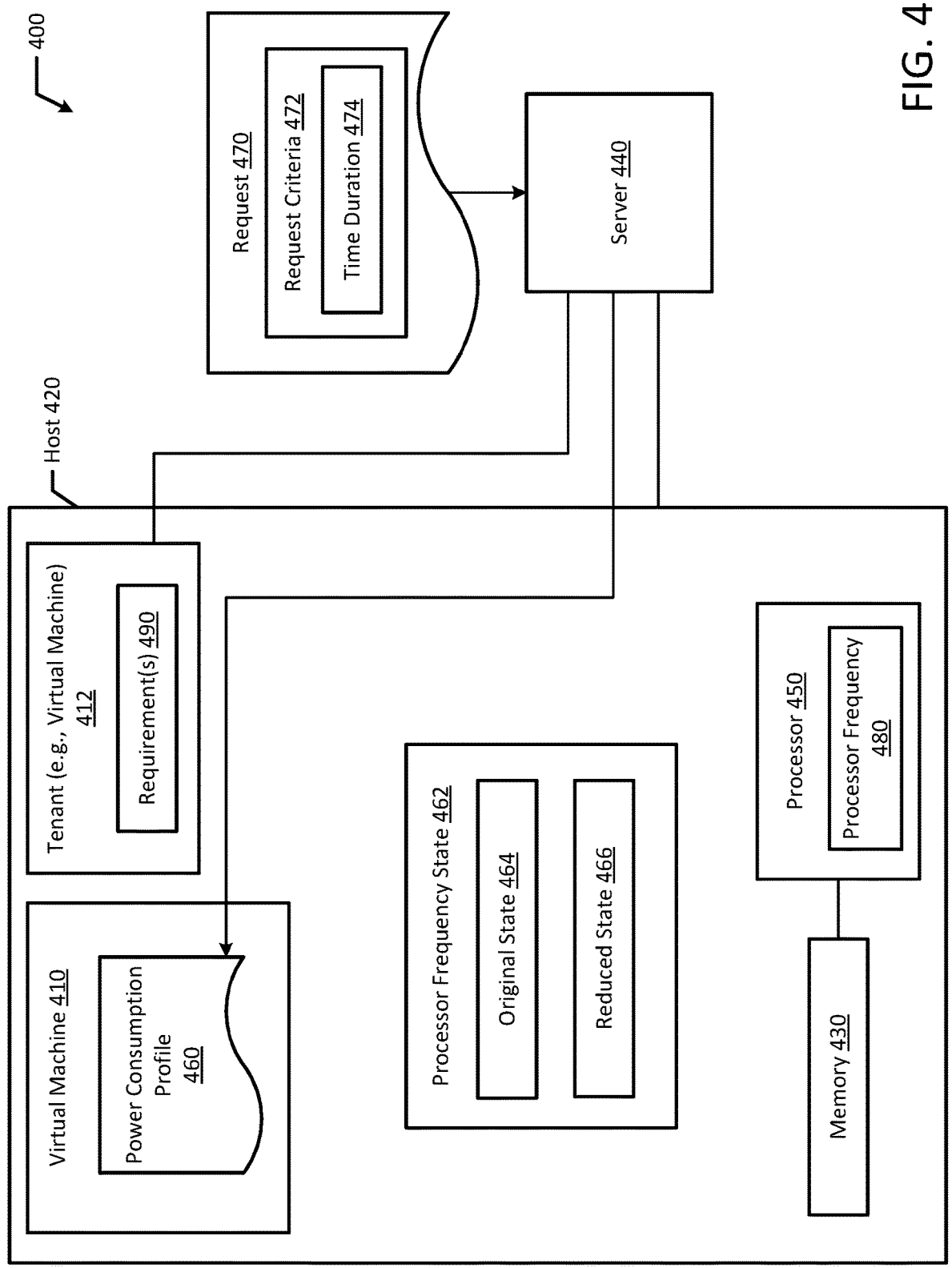
FIG. 4 illustrates a block diagram of an example power consumption optimization system according to an example embodiment of the present disclosure.

FIG. 4 is a block diagram of an example power consumption optimization system 400 according to an example embodiment of the present disclosure. The power consumption optimization system 400 may include a virtual machine (VM) 410 provisioned on a host 420, a memory 430, a server 440, and a processor 450 in communication with the memory 430. The processor 450 may cause the server 440 to store a power consumption profile 460 of the virtual machine 410 provisioned on the host 420. The virtual machine 410 provisioned on the host 420 may run at a processor frequency state 462. Additionally, the processor 450 may cause the server 440 to receive a request 470 to lower a processor frequency 480 for the virtual machine 410 from an original processor frequency state 464 to a reduced processor frequency state 466. The request 470 may have request criteria 472 indicating a time duration 474 associated with the request 470. The processor 450 may also cause the server 440 to validate the request criteria 472, and validate a requirement 490 of at least one other tenant 412 on the host 420. Responsive to validating the request criteria 472 and the requirement 490 of the at least one other tenant 412 on the host 420, the processor 450 may then confirm the request 470 to lower the processor frequency 480. Additionally, the server 440 lowers the processor frequency 480 to the reduced processor frequency state 466 during the time duration 474.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a virtual machine (VM);
a memory;
a server; and
at least one processor in communication with the memory, wherein the at least one processor causes the server to:
store a power consumption profile of the VM, which is provisioned on a host to run at a processor frequency state, the power consumption profile including requirements of the VM, the requirements indicating whether frequency scaling is allowed by the VM and at least one threshold processor frequency that is acceptable for the VM,
receive a request to lower a processor frequency for the VM from an original processor frequency state to a reduced processor frequency state,
validate a request criteria,
validate at least one requirement of at least one other tenant on the host,
confirm the request to lower the processor frequency, and
lower the processor frequency to the reduced processor frequency state.

2. The system of claim 1, wherein the server includes an application program interface (API) hosted on the server, the API receives the request, validates the request criteria and the at least one requirement of the at least one other tenant on the host, and confirms the request.

3. The system of claim 2, wherein a cloud VM API call includes the request.

4. The system of claim 1, wherein the power consumption profile indicates an acceptable processor frequency range for the virtual machine.

5. The system of claim 1, wherein the at least on processor causes the server to reject a second request having second request criteria responsive to the second request criteria failing validation.

6. The system of claim 1, wherein the request criteria indicates a time duration associated with the request, and the at least one processor causes the server to raise the processor frequency from the reduced processor frequency state back to the original processor frequency state after the time duration ends.

7. A method comprising:
storing a power consumption profile of a virtual machine (VM), which is provisioned on a host to run at a processor frequency state, the power consumption profile including requirements of the VM, the requirements indicating whether frequency scaling is allowed by the VM and at least one threshold processor frequency that is acceptable for the VM;
receiving a request to lower a processor frequency for the VM from an original processor frequency state to a reduced processor frequency state;
validating a request criteria;
validating at least one requirement of at least one other tenant on the host;
confirming the request to lower the processor frequency; and
lowering the processor frequency to the reduced processor frequency state.

8. The method of claim 7, wherein an application program interface hosted on a server receives the request, validates the request criteria and the at least one requirement of the at least one other tenant on the host, and confirms the request.

9. The method of claim 8, wherein a cloud (VM) application program interface (API) call includes the request.

10. The method of claim 7, wherein the VM on the host has a power consumption profile, the power consumption profile indicates an acceptable processor frequency range for the VM.

11. The method of claim 7, further comprising:
responsive to second request criteria and the at least one requirement of the at least one other tenant on the host failing validation, rejecting a second request.

12. The method of claim 7, wherein validating the at least one requirement of the at least one other tenant includes reviewing at least one power consumption profile associated with the respective at least one other tenant with respect to the request.

13. The method of claim 7, further comprising raising the processor frequency from the reduced processor frequency state back to the original processor frequency state after a time duration ends, wherein the request criteria indicates the time duration associated with the request.

14. The method of claim 7, wherein lowering the processor frequency includes migrating the VM from the host operating at a first frequency state to a different host operating at a second processor frequency state, and wherein the second processor frequency state is lower than the first processor frequency state.

15. The method of claim 14, wherein the second processor frequency state is the same as the reduced frequency state.

16. The method of claim 14, further comprising migrating the VM back to the host operating at the first frequency state when a time duration ends, wherein the request criteria indicates the time duration associated with the request.

17. The method of claim 7, further comprising, providing, by a cloud user, the power consumption profile to a server.

18. A non-transitory machine readable medium storing code, which when executed by a processor, is configured to:
   store a power consumption profile of a virtual machine (VM), which is provisioned on a host to run at a processor frequency state, the power consumption profile including requirements of the VM, the requirements indicating whether frequency scaling is allowed by the VM and at least one threshold processor frequency that is acceptable for the VM;
   receive a request to lower a processor frequency for the VM from an original processor frequency state to a reduced processor frequency state;
   validate a request criteria;
   validate at least one requirement of at least one other tenant on the host;
   confirm the request to lower the processor frequency; and
   lower the processor frequency to the reduced processor frequency state.

19. The non-transitory machine readable medium of claim 18, wherein an API hosted on a server receives the request, validates the request criteria and the at least one requirement of the at least one other tenant on the host, and confirms the request.

20. The non-transitory machine readable medium of claim 19, wherein a cloud VM API call includes the request.

* * * * *